(12) United States Patent
Chen

(10) Patent No.: US 9,184,656 B2
(45) Date of Patent: Nov. 10, 2015

(54) SWITCHING POWER SUPPLY

(71) Applicant: FUJI ELECTRIC CO., LTD., Kawasaki-shi (JP)

(72) Inventor: Jian Chen, Matsumoto (JP)

(73) Assignee: FUJI ELECTRIC CO., LTD. (JP)

( * ) Notice: Subject to any disclaimer, the term of this patent is extended or adjusted under 35 U.S.C. 154(b) by 55 days.

(21) Appl. No.: 14/099,302

(22) Filed: Dec. 6, 2013

(65) Prior Publication Data

US 2014/0185334 A1    Jul. 3, 2014

(30) Foreign Application Priority Data

Dec. 30, 2012  (JP) ................................. 2012-289265

(51) Int. Cl.
  *H02M 1/42*   (2007.01)
  *H02M 3/335*  (2006.01)
  *H02M 1/00*   (2007.01)

(52) U.S. Cl.
  CPC .......... *H02M 1/4225* (2013.01); *H02M 1/4258* (2013.01); *H02M 3/335* (2013.01); *H02M 2001/007* (2013.01); *H02M 2001/0032* (2013.01)

(58) Field of Classification Search
  CPC .. H02M 1/4225; H02M 1/4258; H02M 3/335
  USPC ...................... 323/205, 207, 222, 226; 363/89
  See application file for complete search history.

(56) References Cited

U.S. PATENT DOCUMENTS

| | | | |
|---|---|---|---|
| 6,294,904 B1 * | 9/2001 | Hirst | 323/283 |
| 6,984,963 B2 | 1/2006 | Pidutti et al. | |
| 7,116,090 B1 | 10/2006 | Yang et al. | |
| 7,176,660 B2 * | 2/2007 | Usui et al. | 323/207 |
| 2005/0259448 A1 * | 11/2005 | Koike | 363/21.01 |
| 2008/0130324 A1 * | 6/2008 | Choi et al. | 363/21.03 |
| 2010/0039835 A1 * | 2/2010 | Shimada | 363/21.12 |
| 2012/0106208 A1 * | 5/2012 | Sugawara | 363/21.13 |

FOREIGN PATENT DOCUMENTS

| | | |
|---|---|---|
| JP | 2007-288855 A | 11/2007 |
| JP | 2010-220330 A | 9/2010 |
| JP | 2011-015570 A | 1/2011 |
| WO | 2004-023634 A1 | 3/2004 |

* cited by examiner

*Primary Examiner* — Emily P Pham
*Assistant Examiner* — Rafael O De Leon Domenech
(74) *Attorney, Agent, or Firm* — Rossi, Kimms & McDowell LLP

(57) ABSTRACT

Aspects of the invention provide a switching power supply in which frequency reduction control in a light load condition both in a power factor correction converter and a DC-DC converter restrains energy loss and achieves optimum efficiency. A switching power supply can include a power factor correction converter and a DC-DC converter. The DC-DC converter can include a load condition detecting means for detecting a condition of the load, and a frequency reducing means for reducing a switching frequency in the DC-DC converter when a light load condition is detected by the load condition detecting means. The power factor correction converter can include a frequency reducing means for reducing a switching frequency in the power factor correction converter corresponding to the load condition detected by the load condition detecting means of the DC-DC converter.

4 Claims, 8 Drawing Sheets

SWITCHING POWER SUPPLY

CROSS-REFERENCE TO RELATED APPLICATION

This application is based on, and claims priority to, Japanese Patent Application No. 2012-289265, filed on Dec. 30, 2012, the contents of which is incorporated herein by reference.

BACKGROUND OF THE INVENTION

1. Field of the Invention

Aspects of the invention relate to switching power supplies exhibiting improved efficiency in a light load condition.

2. Description of the Related Art

To ensure stability and safety of commercial power systems, power factor correction is obligated to switching power supplies with a power consumption larger than 75 W. Accordingly, proposed recently are switching power supplies composed of a power factor correction converter (PFC) with a small sized and high efficiency and a DC-DC converter that converts a DC voltage obtained using the power factor correction converter to a DC output voltage corresponding to a specification of a load. Japanese Unexamined Patent Application Publication No. 2007-288855 (also referred to herein as "Patent Document 1"), for example, discloses this type of switching power supply. Most of such DC-DC converters, with a rated load power of about 100 W, employ a quasi-resonance (QR) converter, which impose relatively little burden on a secondary side rectifying diode.

FIG. 8 shows a schematic construction of a switching power supply 1 comprising a power factor correction converter 2 and a DC-DC converter 3, which is a quasi-resonance converter. A rectifying circuit 4 rectifies an AC power supplied from a commercial power supply 5 through a noise filter 6 and delivers to the power factor correction converter 2.

The power factor correction converter 2 is basically composed of an inductor L1 connected to the rectifying circuit 4 and a switching element Q1 to form a current path through the inductor L1 in an ON period of the switching element Q1. The power factor correction circuit 2 also comprises a diode D1 to form a current path between the inductor L1 and an output capacitor C2 in an OFF period of the switching element Q1. The control circuit IC1 ON/OFF-drives the switching element Q1 and controls the current through the inductor L1 to obtain a stabilized DC voltage Vb.

Resistors R1 and R2 divide the DC voltage Vb obtained across the output capacitor C2 to detect the voltage Vb, and feeds back the detected voltage to the control circuit IC1. A shunt resistor R3 detects the current flowing through the inductor L1. Japanese Unexamined Patent Application Publication No. 2010-220330 (also referred to herein as "Patent Document 2"), for example, discloses operation and effect of such a power factor correction converter 2 in detail.

The DC-DC converter 3, which is a quasi-resonance converter, is basically provided with a switching element Q2 connected in series to a primary winding P1 of an isolation transformer T, the primary winding P1 receiving the output, the DC voltage Vb, of the power factor conversion converter 2. The DC-DC converter 3 is also provided with a resonance capacitor C4 in parallel with the switching element Q2 and an output capacitor C5 connected through a rectifying diode D2 to the secondary winding S1 of the isolation transformer. A control circuit IC2 ON/OFF-drives the switching element Q2 to generate a quasi-resonant oscillation in a resonance circuit composed of a leakage inductance of the isolation transformer T and the resonance capacitor C4, thereby generating a specified DC output voltage Vo.

Resistors R4 and R5 divides the DC output voltage Vo obtained across the output capacitor C5 to detect the output voltage Vo and feeds back the divided voltage to the control circuit IC2 through a feedback circuit FB. A shunt resistor R6 detects the current flowing in the switching element Q2. The DC-DC converter 3 detects a ZCD voltage developed across an auxiliary winding P2 of the isolation transformer T and controls the turning ON timing of the switching element Q2. Japanese Unexamined Patent Application Publication No. 2011-015570 (also referred to herein is "Patent document 3"), for example, discloses details about operation and effect of such a DC-DC converter 3, which is a quasi-resonance converter.

The switching power supply 1 significantly improves power factor thereof owing to the power factor correction converter 2 provided on the preliminary stage of the DC-DC converter 3. The power factor correction converter 2 however, also generates energy loss inevitably. Especially in a light load condition, a switching frequency becomes high in both the power factor correction converter 2 and the DC-DCC converter 3. Therefore, switching loss increases in the switching elements Q1 and Q2 deteriorating the efficiency of the switching power supply 1.

In order to reduce the switching loss in the switching elements Q1 and Q2, International Patent Application Publication No. WO2004/023634 (also referred to herein as "Patent Document 4"), for example, discloses a control method of so-called bottom skip which uses a timing at which a resonant oscillation current that arises after turning OFF of the switching elements Q1 and Q2 becomes zero. This bottom skip control delays a turning ON timing of the switching elements Q1 and Q2 in a light load condition to reduce a switching frequency, thereby restraining a loss. The number of bottom skips in the bottom skip control is set at [0] in a normal condition, or heavy load condition, and set at gradually larger values as the load becomes lighter.

The bottom skip control is conducted in the power factor correction converter 2 and DC-DC converter 3 by detecting a load condition, a magnitude of the load, with a load detecting means provided in the control circuits IC1 and IC2. Conducting such a bottom skip control, however, does not necessarily improve efficiency. In a heavy load condition, for example, conduction loss is generally dominant over switching loss. As a result, switching frequency reduction in a heavy load condition increases the conduction loss, rather deteriorating the efficacy.

Consequently, a load condition, or a magnitude of the load, needs to be detected precisely in order to obtain optimum efficiency. A load condition detecting means in a DC-DC converter 3 generally carries out load condition detection based on information about the DC output voltage Vo obtained through the feedback circuit FB. Here, an input voltage to the DC-DC converter 3 is stabilized by the power factor correction converter 2. Consequently, the load condition is detected precisely in the DC-DC converter 3.

On the other hand, a load a condition detecting means in the power factor correction converter 2 detects a load condition from an information about the load current detected through the shunt resistor R3. Here in the power factor correction converter 2, a magnitude of an inductor current is controlled corresponding to the phase angle of the input AC voltage Vac. As a consequence, the detection precision of the load condition in the power factor correction converter 2 changes inevitably depending on the phase angle of the input AC voltage Vac. It is therefore difficult to detect the load condition with high precision in the overall input voltage range of the input AC voltage Vac.

SUMMARY OF THE INVENTION

Aspects of the invention have been made in view of the foregoing and embodiments of the present invention provide a switching power supply that exhibits optimized efficiency allowing minimum loss by conducting frequency reduction control in both the power factor correction converter and the DC-DC converter in the light load condition through detection of a load condition independently of the input AC voltage Embodiments of the invention include a switching power supply of the present invention comprises: a power factor correction converter that switches an input AC voltage and delivers a DC voltage; and a DC-DC converter that switches the output voltage of the power factor correction converter and delivers a specified DC output voltage to a load. The DC-DC converter comprises a load condition detecting means for detecting a condition of the load, and a frequency reducing means for reducing a switching frequency in the DC-DC converter when a light load condition is detected by the load condition detecting means. The power factor correction converter comprises a frequency reducing means for reducing a switching frequency in the power factor correction converter corresponding to the load condition detected by the load condition detecting means of the DC-DC converter.

Embodiments of the invention include a power factor correction converter and a DC-DC converter is characterized in that the information on the load condition detected in the DC-DC converter for frequency reduction control of the DC-DC converter is utilized as information for frequency reduction control of the power factor correction converter.

The DC-DC converter can include a quasi-resonance converter.

The frequency reducing means of the power factor correction converter and the frequency reducing means of the DC-DC converter can include a bottom skip control means that delays a turning ON timing of a respective switching element provided in the power factor correction converter and in the DC-DC converter, and the load condition detecting means of the DC-DC converter comprises a load information delivering means for delivering bottom skip control information corresponding to the load condition to the power factor correction converter.

Embodiments of the invention detect the load dividing a magnitude of the load into n steps, where n is a natural number of two or larger, determines a number of bottoms to regulate the turning ON timing of the switching element provided in the DC-DC converter, and delivers the determined number of bottoms as the bottom skip control information to the power factor correction converter.

Embodiments of the bottom skip control means of the power factor correction converter can control the turning ON timing of the switching element provided in the power factor correction converter with a number of bottoms different from the number of bottoms in the DC-DC converter.

Embodiments of the invention include a switching power supply having a construction as stated above, the input voltage to the DC-DC converter is stabilized by the power factor correction converter. As a result, the load condition can be detected with a high precision by the load condition detecting means provided in the DC-DC converter. Under these circumstances, frequency reduction control, which is a bottom skip control, is conducted in the DC-DC converter and the power factor correction converter based on the detected load condition i.e., load detection information.

Consequently, frequency reduction control, which is bottom skip control, in the power factor correction converter is performed appropriately without depending on the input AC voltage. As a result, energy losses in the DC-DC converter and the power factor correction converter are restrained to optimize conversion efficiency. Here, it is only needed to inform the load detecting information, which is bottom skip control information, from the DC-DC converter to the power factor correction converter, and thus the overall construction is very simple. Therefore, a great advantage is obtained in practical application of embodiments of the invention.

DETAILED DESCRIPTION

The following describes in detail a switching power supply according to a certain embodiments of the invention with reference to accompanying drawings.

Figure 1:
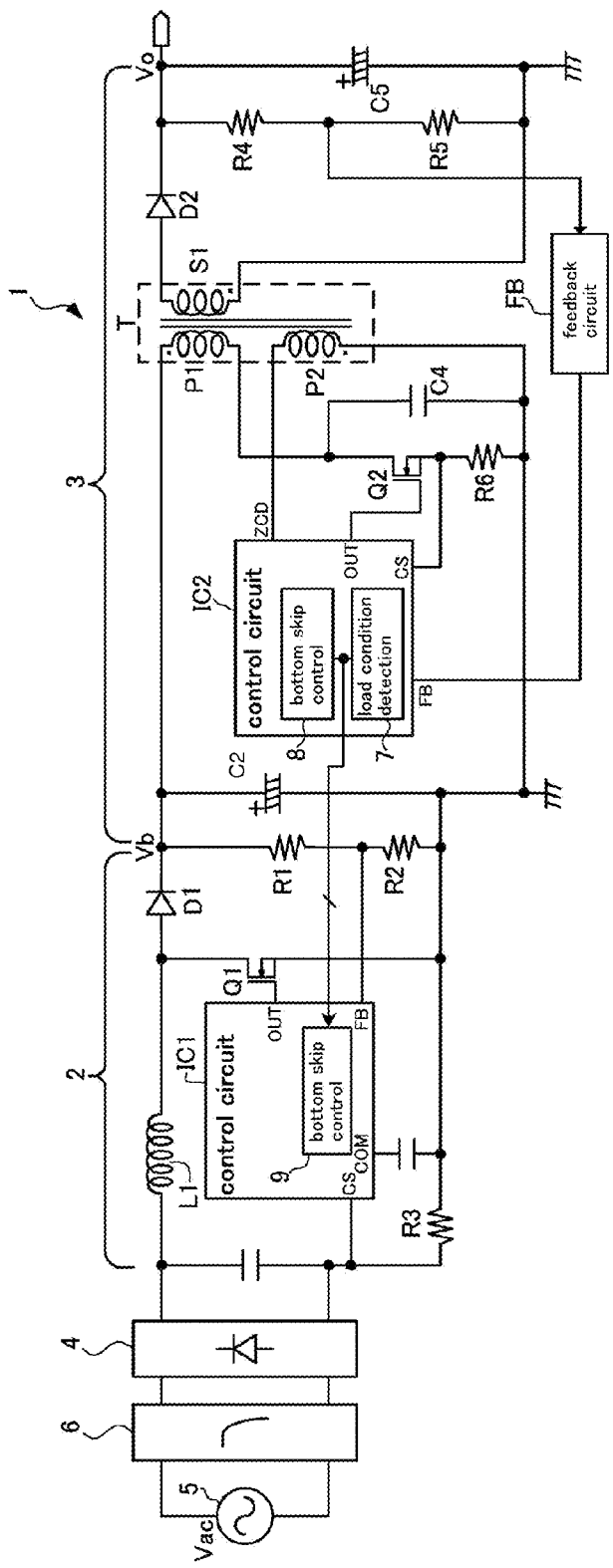
FIG. 1 shows a schematic construction of a switching power supply according to an embodiment of the present invention.
Figure 8:
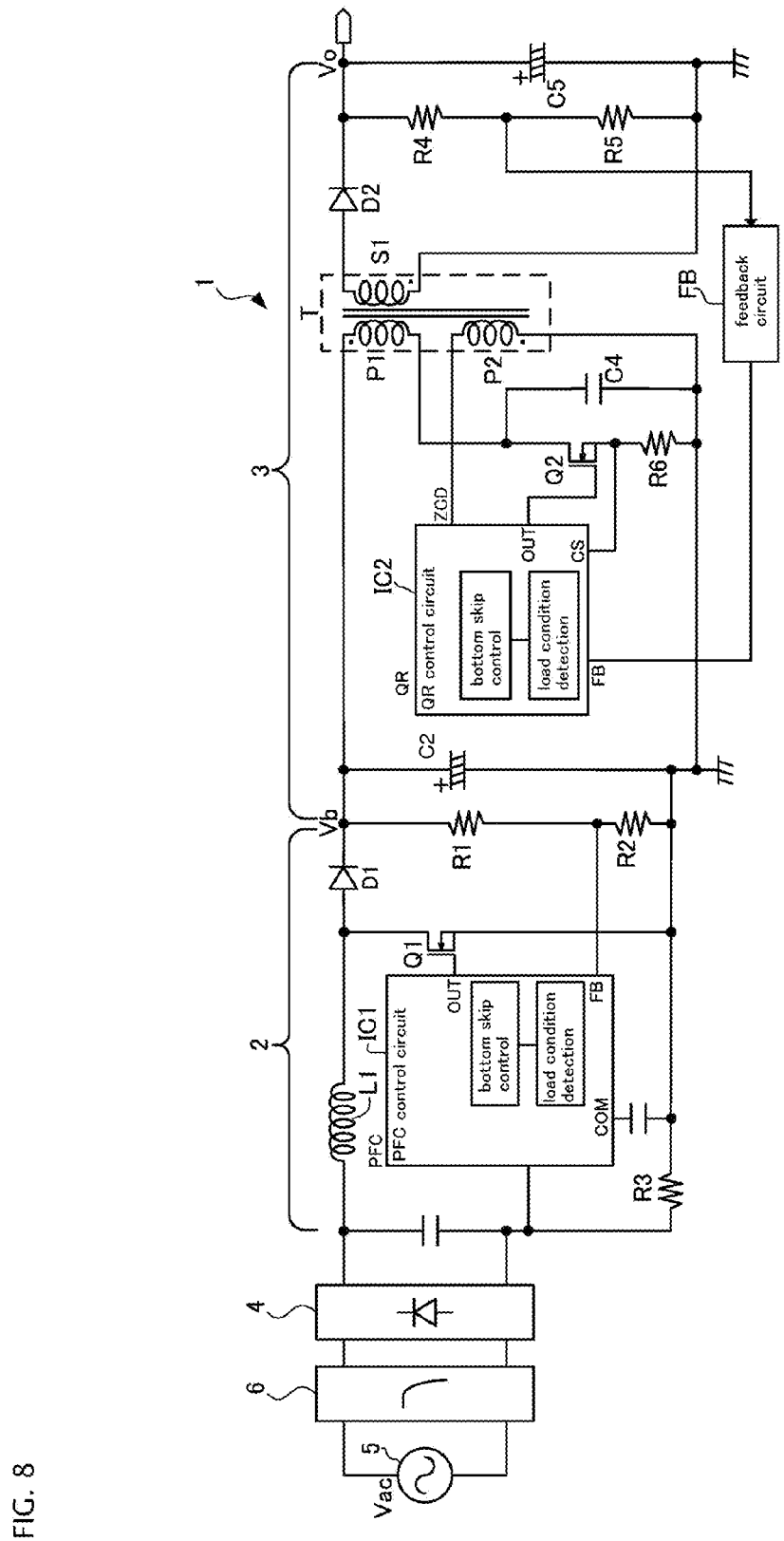
FIG. 8 shows a schematic construction of a conventionally common switching power supply provided with a power factor correction converter and a DC-DC converter.

FIG. 1 shows a schematic construction of a switching power supply according to an embodiment of the present invention. The switching power supply 1, like the conventional switching power supply 1 shown in FIG. 8, comprises a power factor correction converter 2 (PFC 2) that switches an input AC voltage Vac and generates a DC voltage Vb, and a DC-DC converter (QR) 3 that switches the DC voltage Vb and generates a DC output voltage Vo for supplying to a load. The same components are given the same symbols as in the switching power supply 1 shown in FIG. 8 and description thereon is omitted.

This switching power supply 1 is characterized in that the DC-DC converter 3 detects load detection information, which is information indicating load condition, for frequency reduction control, which is a bottom skip control, and give the load detection information to the power factor correction converter 2; and the power factor converter 2 conducts frequency reduction control, which is a bottom skip control, according to the load detection information delivered by the DC-DC converter 3.

A control circuit IC2 of the DC-DC converter 3 comprises a load condition detecting means 7 for detecting a magnitude of the load from the information on the DC output voltage Vo, which is an FB signal, fed back through the feedback circuit FB. The control circuit IC2 of the DC-DC converter 3 also comprises a frequency reducing means 8 that controls to delay a turning ON timing of the switching element Q2 according to the load condition detected with the load condition detecting means 7 and reduces the switching frequency of the switching element Q2 in the light load condition. The control circuit IC1 of the power factor correction converter 2 likewise comprises a frequency reducing means 9 that controls to delay a turning ON timing of the switching element Q1 in a light load condition and reduces the switching frequency of the switching element Q1. The frequency reducing means 8 and 9 specifically composed of respective bottom skip control means.

In the switching power supply 1 according to the embodiment of the invention, the load condition detecting means 7 provided in the DC-DC converter 3 detects load detection information to use in control of the frequency reducing means 8, which is a bottom skip control means, and delivers the load detecting information also to the power factor correction converter 2. The frequency reducing means 9 of the power factor correction converter 2 is operated according to the load detection information delivered by the DC-DC converter 3.

Figure 2:
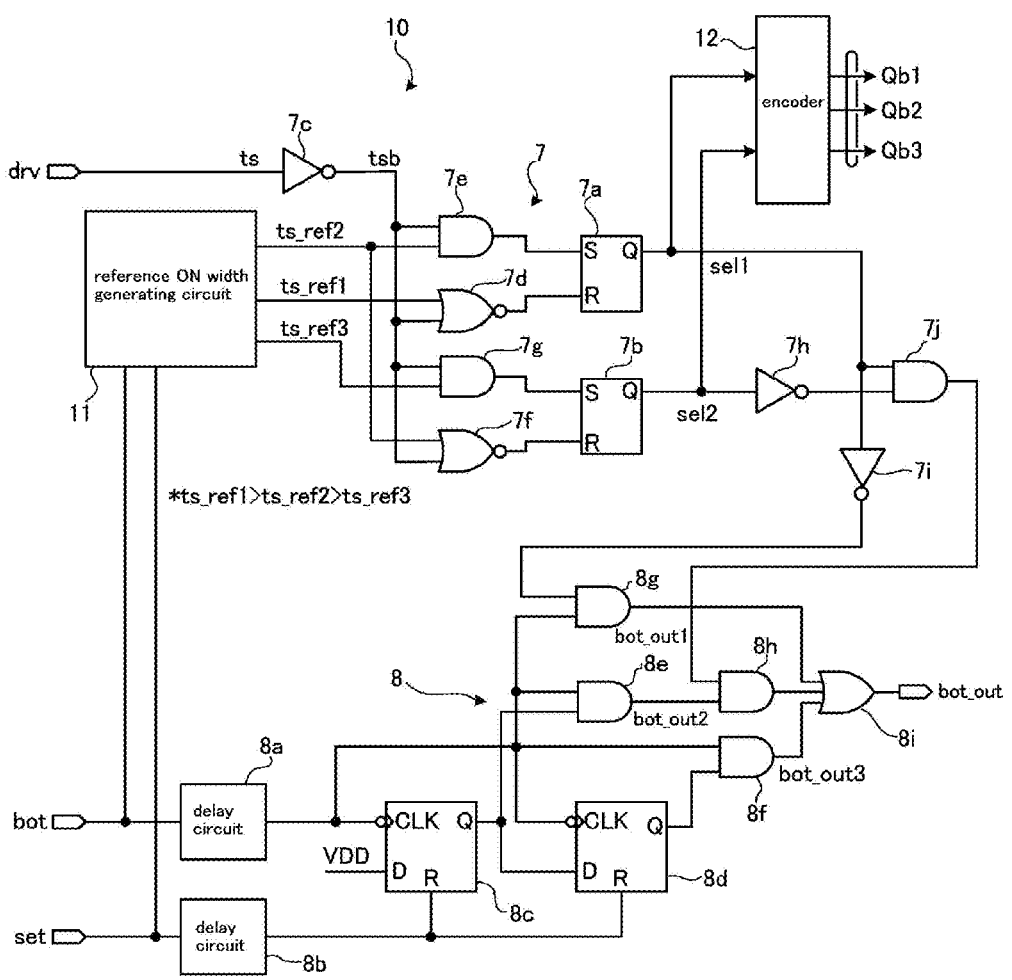
FIG. 2 shows an example of construction of a bottom skip control circuit in a DC-DC converter.

Now, a description is made here about the frequency reduction control, i.e., bottom skip control, in the DC-DC converter 3. The bottom skip control in the DC-DC converter 3 is conducted by detecting a load condition based on the tendency that the ON width of the switching element Q2 becomes longer as the load becomes heavier, which means larger output power. FIG. 2 shows an example of construction of a bottom skip control circuit 10 of the DC-DC converter 3. This bottom skip control circuit 10 includes the load condition detecting means 7 and the bottom skip control means 8, which is a frequency reducing means. The bottom skip control circuit 10 generates an output signal bot-out that regulates a turning ON timing of the switching element Q2.

The load condition detecting means 7 of the bottom skip control circuit 10 determines the magnitude of the load using the fact that an L level period of a driving signal 'drv' for the switching element Q2 corresponds to an ON width 'ts' of the switching element Q2. The load condition detecting means 7 determines a load condition, or a magnitude of the load, by comparing the ON-width ts of the switching element Q2 with reference ON widths ts_ref1, ts_ref2, and ts_ref3 generated in a reference ON width generating circuit 11. The reference ON width generating circuit 11 generates the reference ON widths ts_ref1, ts_ref2, and ts_ref3 with different pulse width according to a setting signal 'set' and a bottom detecting signal 'bot', which are issued upon turning OFF of the switching element Q2.

The bottom detecting signal 'bot' is detected when a ZCD voltage developed on an auxiliary winding P2 of the isolation transformer T decreased below a predetermined threshold value recognizing a zero value of a quasi-resonant oscillation current after turning OFF of the switching element Q2. The reference ON width generating circuit 11 generates the reference ON widths ts_ref1, ts_ref2, and ts_ref3 with a pulse width from a common reference timing of turning OFF of the switching element Q2 to a first, second, or third input timing of the bottom detecting signal 'bot', respectively. These reference ON widths ts_ref1, ts_ref2, and ts_ref3 are in an inequality relationship: ts_ref1>ts_ref2>ts_ref3.

More specifically, the load condition detecting means 7 is provided with two reset preference type flip-flops 7a and 7b. The flip-flop 7a is reset by a logical output through a NOR circuit 7d of the driving signal 'dry' with an ON width ts inverted through a NOT circuit 7c and the reference ON width ts_ref1. The flip-flop 7a is set by a logical output of the driving signal 'dry' and the reference ON width ts_ref2, the logical output being executed in an AND circuit 7e. On the other hand, the flip-flop 7b is reset by a logical output through a NOR circuit 7f of the driving signal 'dry' inverted through a NOT circuit 7c and the reference ON width ts_ref2. The flip-flop 7b is set by a logical output of the driving signal 'dry' and the reference ON width ts_ref3, the logical output being executed in an AND circuit 7g.

As a consequence, the flip-flop 7a is set under a relationship: ts_ref1>ts>ts_ref2; and the flip-flop 7b is set under a relationship: ts_ref2>ts>ts_ref3. The output signals of the flip-flops 7a and 7b are used for bottom skip control after passing through a NOT circuit 7h, a NOT circuit 7i, and an AND circuit 7j. More specifically, the output signal of the flip-flop 7a, which is a first selection control signal sel1 is given to an AND circuit 8g after inversion through the NOT circuit 7i. Consequently, the AND circuit 8g is active only when the flip-flop 7a is reset.

The output of the flip-flop 7a and the output of the flip-flop 7b that is inverted through the NOT circuit 7h are given to the AND circuit 7j and logically processed there. The output of the AND circuit 7j is given to an AND circuit 8h, which will be described later. Consequently, the AND circuit 8h is active only when the flip-flop 7a is set and the flip-flop 7b is reset.

The bottom skip control means 8, which is a frequency reducing means, is provided with a delay circuit 8a for delaying the bottom detecting signal 'bot' and a delay circuit 8b for delaying the setting signal 'set'. The delay circuits 8a and 8b give a delay time of half the pulse width, 200 ns, for example, of the bottom detecting signal 'bot', to the bottom detecting signal 'bot' and to the setting signal 'set' to regulate operation timing in the bottom skip control. The bottom detecting signal 'bot' delayed through the delay circuit 8a is used for generating the output signal bot-out and simultaneously used as a clock signal for setting operation of series-connected two stages of D flip-flops 8c and 8d.

The first stage D flip-flop 8c is reset by the setting signal 'set' delayed through the delay circuit 8b and is set receiving a power supply voltage VDD with the clock signal. The second stage D flip-flop 8d is reset by the setting signal 'set' delayed through the delay circuit 8b and is set receiving the output of the first stage D flip-flop 8c.

Consequently, the first stage D flip-flop 8c is set to an H level at the timing delayed from the input of the first bottom detecting signal 'bot' by half the pulse width of the bottom detecting signal 'bot'. The second stage D flip-flop 8d is set to an H level at the timing delayed from the input of the second bottom detecting signal 'bot' by half the pulse width of the bottom detecting signal 'bot'.

The set output signal from the first stage D flip-flop 8c is delivered to an AND circuit 8e, and an output signal bot_out2 is delivered at the timing of the second input of the bottom detecting signal 'bot' in synchronism with the input timing of the bottom detecting signal 'bot'. The set output signal from the second stage D flip-flop 8d is delivered to an AND circuit 8f, and an output signal bot_out3 is delivered at the timing of the third input of the bottom detecting signal 'bot' in synchronism with the input timing of the bottom detecting signal 'bot'. This output signal bot_out3 is delivered through an OR circuit 8i as the output signal bot-out for regulating turning ON timing of the switching element Q2.

The bottom detecting signal 'bot' delayed through the delay circuit 8a is given to the AND circuit 8g, which is controlled to be active when the flip-flop 7a is reset and the first selection control signal sel1 is not delivered, i.e., in the normal load condition or in a heavy load condition. Thus, the AND circuit 8g delivers the output signal bot_out1 at the timing of input of the first bottom detecting signal 'bot' under a heavy load condition in synchronism with an input timing of the bottom detecting signal 'bot'. The output signal bot_out1 is delivered through the OR circuit 8i as the output signal bot-out for regulating the timing of turning ON of the switching element Q2. The output signal bot_out1 is of course delivered before the output signals bot_out2 and bot_out3.

The output signal bot_out2 that is generated at the timing of input of the second bottom detecting signal 'bot' in the AND circuit 8e is delivered to the AND circuit 8h. This AND circuit 8h is controlled to be active, as described earlier, when the flip-flop 7a is set and the flip-flop 7b is reset, i.e., in a middle load condition. Thus, the AND circuit 8e delivers the output signal 'bot_out2' at the timing of the second input of the bottom detecting signal 'bot' in synchronism with the input timing of the bottom detecting signal 'bot' under the middle load condition. The output signal bot_out2 is delivered through the OR circuit 8i as the output signal 'bot-out' for regulating the timing of turning ON of the switching element Q2.

The output signal 'bot_out3' that is generated at the timing of third input of the bottom detecting signal 'bot' in the AND circuit 8f is controlled to be active when the flip-flop 7a is set and the flip-flop 7b is set, i.e., under a light load condition. The output signal bot_out3 is delivered through the OR circuit 8i as the output signal 'bot-out' for regulating the timing of turning ON of the switching element Q2.

Figure 3:
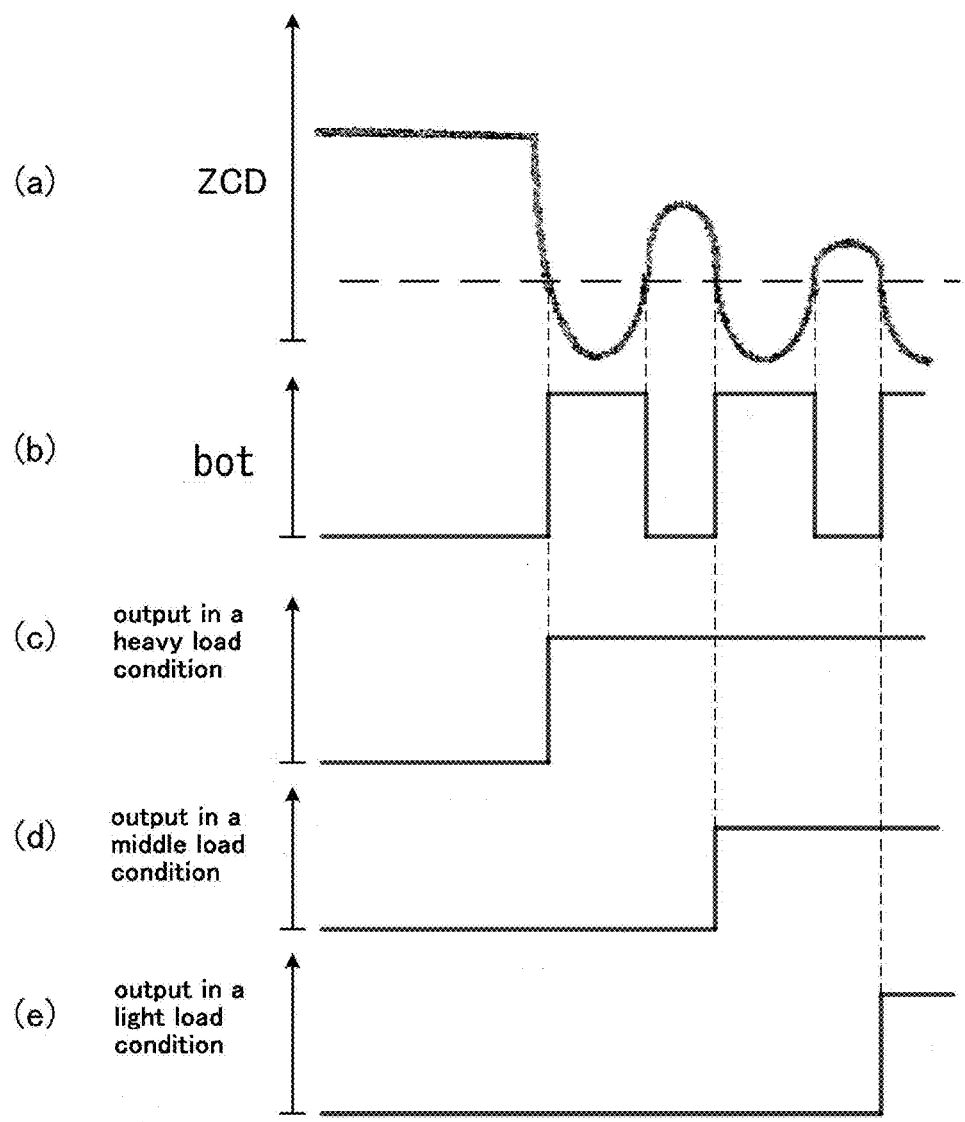
FIG. 3 shows an example of output signals in the bottom skip control corresponding to the load condition.

Thus, the output signal 'bot-out' is delivered, as shown in FIG. 3, corresponding to the load condition: at the timing of the first detection of the bottom detecting signal 'bot' in a heavy load condition, at the timing of the second detection of the bottom detecting signal 'bot' in a middle load condition, and at the timing of the third detection of the bottom detecting signal 'bot' in a light load condition. The timing of turning ON of the switching element Q2 is regulated by the output signal 'bot-out' that is delay-controlled at three steps corresponding to the load condition. Thus, the switching frequency is reduced in the middle load condition and the light load condition.

The bottom skip control circuit 10 for controlling bottom skip operation having the construction described above is further provided with a load information delivering means that delivers load detection information indicated by the first and second selection control signals sel1 and sel2 to the power factor correction converter 2. The load information delivering means is composed, for example, of an encoder 12 that generates control signals Qb1, Qb2, and Qb3 for determining the number of bottoms to regulate the timing of turning ON of the switching element Q1 from the first and second selection control signals sel1 and sel2.

More specifically, the encoder 12 is provided with a function for generating the control signals Qb1 and Qb2 by logical processing similar to the logical processing function of the NOT circuits 7h and 7i, and the AND circuit 7j. The encoder circuit is also provided with a logical processing function that generates the control signal Qb3 at an H level only when the flip-flop 7a is set and the flip-flop 7b is set. Consequently, the control signal Qb1, Qb2, and Qb3 delivered from the encoder 12 in parallel are [100 or HLL] in the heavy load condition, [010 or LHL] in the middle load condition, and [001 or LLH] in the light load condition. The control signal Qb1 is a signal indicating the first bottom detection at the number of skips of [0]; the control signal Qb2 is a signal indicating the second bottom detection at the number of skips of [1]; and the control signal Qb3 is a signal indicating the third bottom detection at the number of skips of [2].

Figure 4:
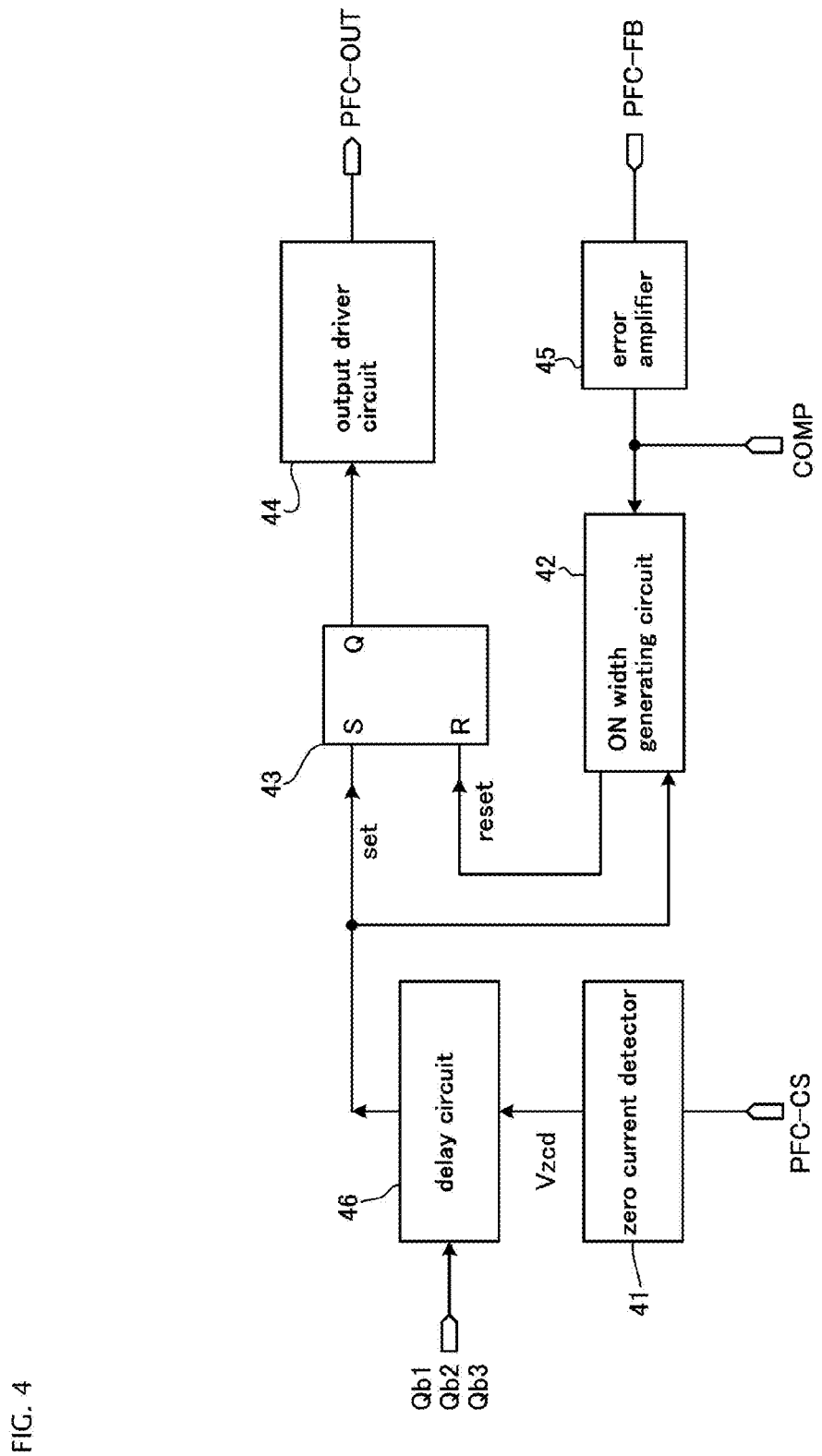
FIG. 4 shows an example of schematic construction of a control circuit in the power factor correction converter.

The control circuit IC1 in the power factor correction converter 2 conducts frequency reduction control, which is a bottom skipping control, receiving the control signals Qb1, Qb2, and Qb3 from the DC-DC converter 3 and constructed, for example, as shown in FIG. 4. The control circuit IC1 is provided as a main component with a flip-flop 43 that is set upon detecting, by a zero current detector 41, a timing of zero value of the resonant oscillation voltage after turning OFF of the switching element Q1, and reset by the output of the ON width generating circuit 42, as shown by the schematic construction of FIG. 4. The output of the flip-flop 43 drives an output driver circuit 44 to generate an output signal PFC-OUT for ON/OFF-driving the switching element Q1.

The ON width generating circuit 42 generates a reset signal with a pulse width regulating the ON width of the switching element Q1 corresponding to the output of an error amplifier 45 for detecting a feedback voltage PFC-FB, which is a divided voltage of the output voltage Vb. More specifically, the ON width generating circuit 42 generates a signal with a wide pulse width, i.e., a wide ON width, when the output voltage of the error amplifier 45 is high, and the ON width generating circuit 42 generates a signal with a narrow pulse width as the output voltage of the error amplifier 45 decreases.

Figure 5:
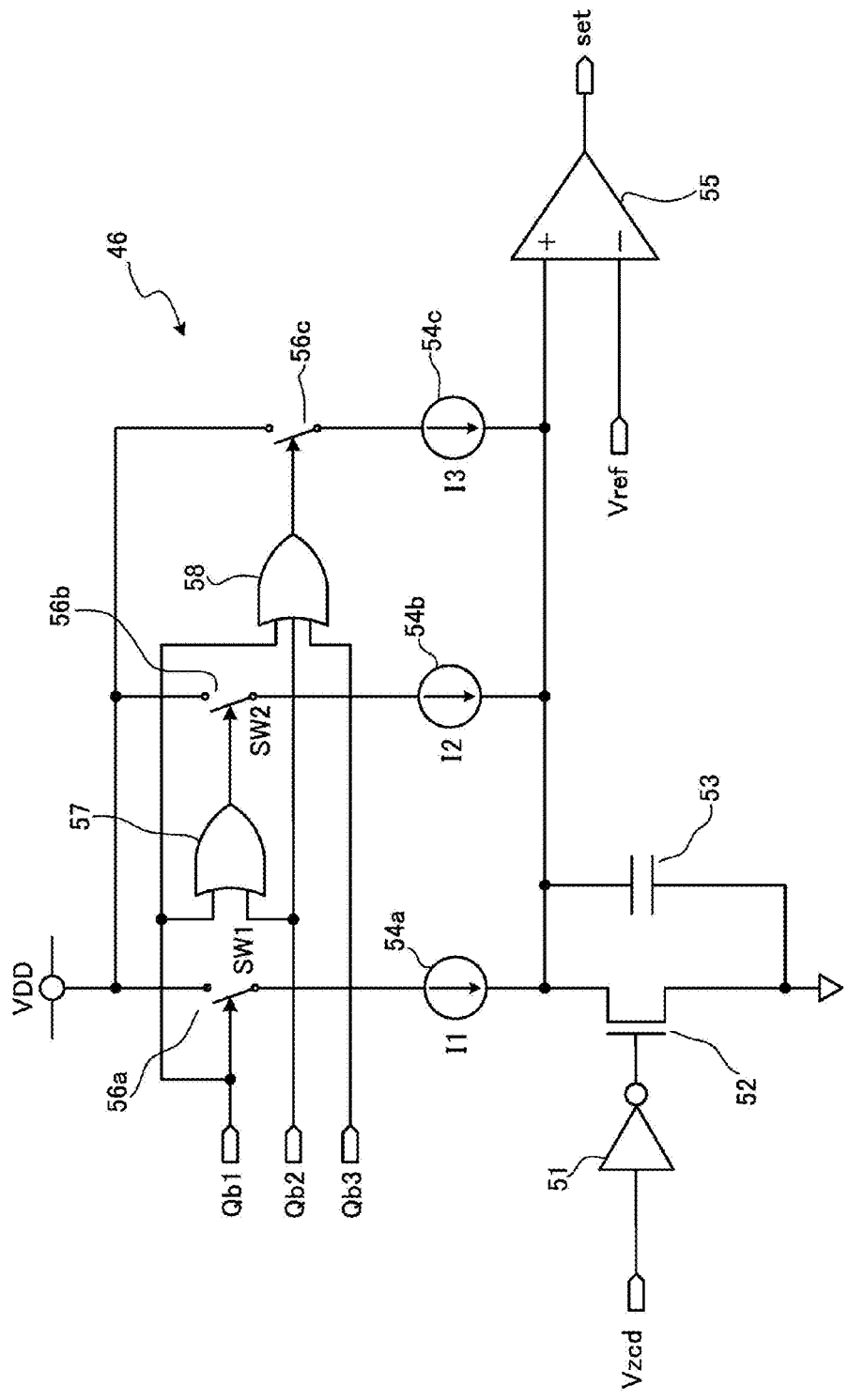
FIG. 5 shows an example of delay circuit in the control circuit shown in FIG. 4.

The setting signal 'set', which sets the flip-flop 43 and triggers the ON width generating circuit 42, is generated through a delay circuit 46 that delay-controls an output signal Vzcd of the zero current detector 41 corresponding to the control signals Qb1, Qb2, and Qb3 delivered by the DC-DC converter 3. The delay circuit 46 comprises as shown in FIG. 5, for example, a NOT circuit 51 inverting the output signal Vzcd, a semiconductor switch 52, which can be a MOSFET, ON/OFF-driven by the NOT circuit 51, and a capacitor 53 parallel connected to the semiconductor switch 52.

The capacitor 53 is charged in the OFF period of the semiconductor switch 52 with selected current of I1, I2 and I3 delivered by the constant current sources 54a, 54b, and 54c, respectively. The capacitor 53 is discharged in the ON period of the semiconductor switch 52. A comparator 55 generates a setting signal 'set' for setting the flip-flop 43 indicated in FIG. 4 when the charged voltage of the capacitor 53 exceeds a predetermined specified reference voltage Vref.

The control signals Qb1, Qb2, and Qb3 are used for controlling charging of the capacitor 53 by the constant current sources 54a, 54b, and 54c. More specifically, the constant current source 54a, 54b, and 54c are driven by the power supply voltage VDD through switches 56a, 56b, and 56c to deliver the constant current I1, I2, and I3. The switch 56a turns ON receiving the control signal Qb1 and drives the constant current source 54a. The switch 56b turns ON receiving the control signal Qb1 or the control signal Qb2 through an OR circuit 57 to drive the constant current source 54b. The switch 56c turns ON receiving any one of the control signals Qb1, Qb2, and Qb3 through an OR circuit 58 to drive the constant current source 54c.

Consequently, the capacitor 53 is charged rapidly, when the control signal Qb1 is given, with the current I1+I2+I3 delivered by the constant current sources 54a, 54b, and 54c. When the Qb2 is given, the capacitor 53 is charged with the current I2+I3 delivered by the constant current sources 54b and 54c. When the Qb3 is given, the capacitor 53 is charged slowly with the current I3 delivered by the constant current sources 54c.

As a result, the period of time for the terminal voltage of the capacitor 53 to be charged up to the reference voltage Vref set for the comparator 55 decreases as the charging current increases. Thus, the comparator 55 reverses the output thereof after passing the charging time on the capacitor 53 determined corresponding to the control signals Qb1, Qb2, and Qb3 from the input timing of the output signal Vzcd. In other words, the comparator 55 delivers the setting signal 'set' after passing delay times Td1, Td2, and Td3 corresponding to the control signals Qb1, Qb2, and Qb3, wherein Td1<Td2<Td3.

The setting signal 'set' delivered by the comparator 55 with the delay time control as described above sets the flip-flop 43 and at the same time triggers the ON width generating circuit 42. Accordingly, the turning ON timing of the switching element Q1 is controlled through the delay times Td1, Td2, and Td3 corresponding to the control signals Qb1, Qb2, and Qb3 that indicate the load condition, thereby conducting the frequency reduction control in the light load condition.

In the switching power supply 1 of an embodiment of the invention having the construction described above, the power factor correction converter 2 performs frequency reduction control corresponding to the load condition that is detected by the DC-DC converter 3. Therefore, the power factor correction converter 2 is not affected by the variation of the input AC voltage Vac, which is the case in power factor correction converters having a conventionally common construction. The DC-DC converter 3 in the switching power supply 1 conducts switching operation receiving a DC voltage Vb stabilized through the power factor converter 2 and generates a DC output voltage Vo for supplying the load. Thus, the DC-DC converter 3 that detects the load condition from the ON width of the switching element Q2 detects the load condition, i.e., a magnitude of the load, with high precision.

Therefore, the DC-DC converter 3 performs frequency reduction control, which is a bottom skip control, in the light load condition corresponding to the load condition that is detected with high precision. The power factor correction converter 2 also performs frequency reduction control in the light load condition corresponding to the load condition that is detected in the DC-DC converter 3 with high precision. Consequently, frequency reduction control is performed appropriately in both the power factor correction converter 2 and the DC-DC converter 3 to restrain energy losses in the switching elements Q1 and Q2, thereby effectively improving the power factor.

Moreover, the power factor correction converter 2 effectively uses the load condition just as detected in the DC-DC converter 3 with a high precision for conducting frequency reduction control in the power factor correction converter 2. Consequently, the frequency reduction control in the power factor correction converter 2 is performed in a simple construction with sufficiently high precision. It is therefore a great advantage in practical application that energy losses are restrained in a simple overall construction of a switching power supply 1 to improve a power factor.

Although the description thus far is made about the bottom skip control in three steps as an example, the number of steps of bottom skip control is not limited to a special number. The load condition, i.e., a magnitude of the load, can be detected by dividing into n steps, where n is a natural number of two or larger, and frequency reduction control, which is a bottom skip control, is conducted corresponding to these load conditions.

Figure 6:
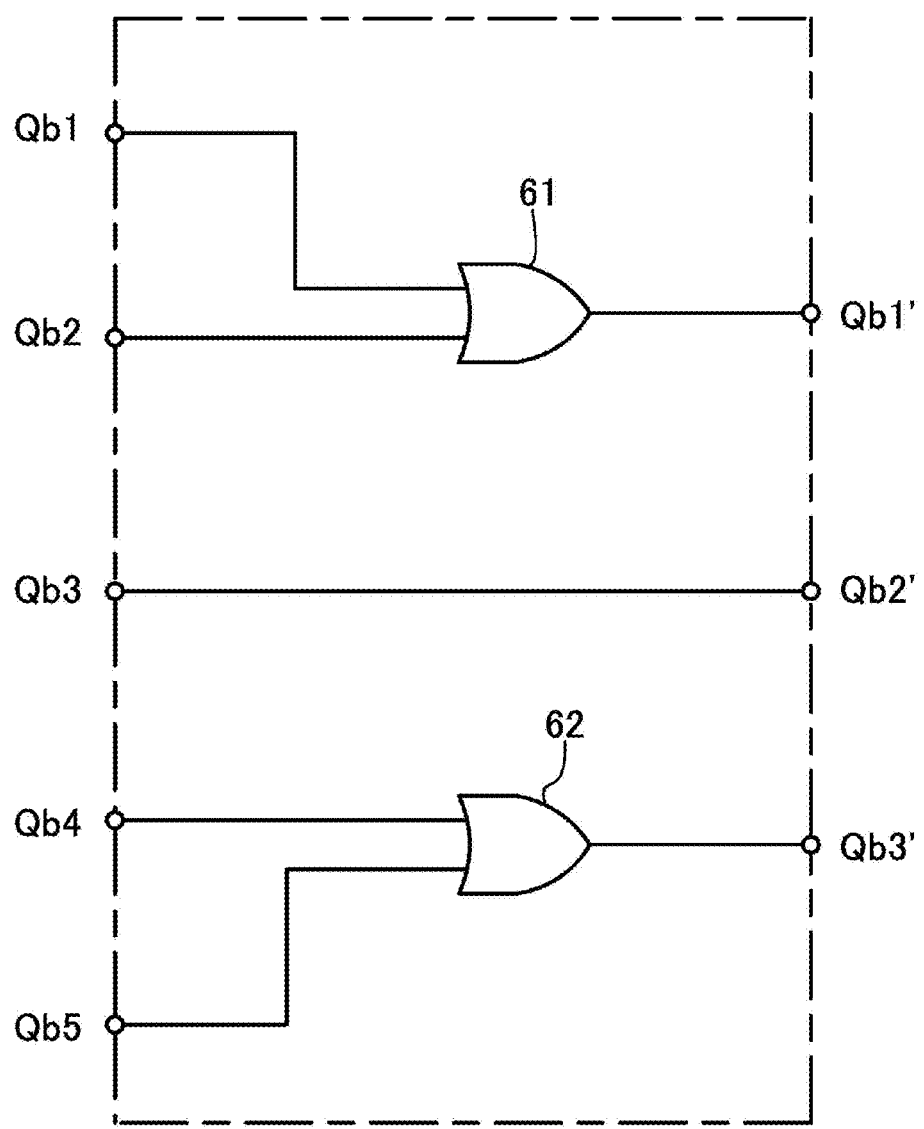
FIG. 6 shows an example of conversion circuit for the control signals.

The control precision of the frequency reduction control, which is a bottom skip control, in the power factor correction 2 does not necessarily equal to the control precision of the frequency reduction control, which is a bottom skipping control, in the DC-DC converter 3. For example, bottom skipping control in the DC-DC converter 3 can be conducted with five steps, while the bottom skipping control in the power factor correction converter 2 is conducted with three steps. In such a case, bottom skip control information indicating the load condition can be converted using a conversion circuit 60 as shown in FIG. 6 and given to the power factor correction converter 2.

The conversion circuit 60 executes logical processing to converts control signals Qb1, Qb2, Qb3, Qb4 and Qb5 indicating five steps of bottom numbers to control signals Qb1', Qb2', and Qb3' indicating three steps of bottom numbers, in which the control signals Qb1 and Qb2 are logically processed through an OR circuit 61 and the control signals Qb4 and Qb5 are logically processed through an OR circuit 62. Use of the conversion circuit 60 allows the power factor correction converter 2 maintaining a bottom detecting number of [1] even when the bottom detecting number in the DC-DC converter 3 is changed from [1] to [2]. Even in the case the bottom detecting number in the DC-DC converter 3 is a large number of [4] or [5], the bottom detecting number in the power factor correction converter 2 can be restrained to [3]. Therefore, appropriate effects of the frequency reduction control, which is a bottom skip control, can be readily achieved in the power factor correction converter 2 and the DC-DC converter 3 corresponding to the load condition.

Figure 7:
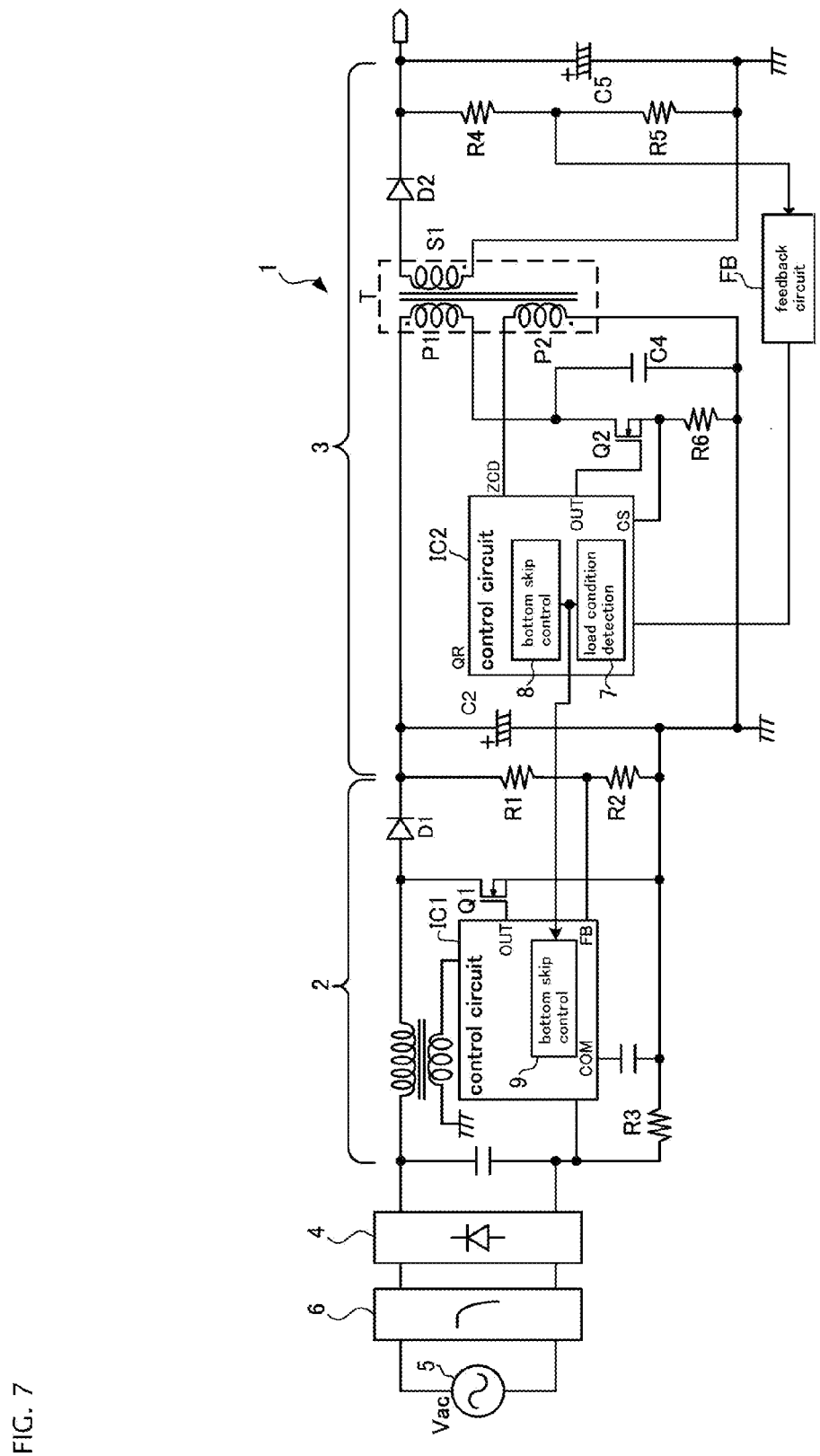
FIG. 7 shows a schematic construction of a switching power supply according to another embodiment of the present invention.

The present invention is not limited to the embodiment described above. The present invention can be applied to a power factor correction converter 2 as shown in FIG. 7, for example, which uses a control circuit IC1 that performs bottom skip control based on the voltage developing through an auxiliary winding of the inductor L1. The present invention can be applied to power factor correction converter 2 with an average current control method as well as the fixed ON width control method as described above. In such a case, the output of an error amplifier used for average current control can be corrected corresponding to the control signals Qb1, Qb2, and Qb3.

Whereas the load condition is detected according to the fact that the ON width of the switching element is proportional to the magnitude of the load in the DC-DC converter 3 in the above description, the load condition can be detected based on the ON-OFF width of the switching element, where the ON-OFF width means the period of time of a switching period of the switching element subtracted by a resonant oscillation period. The function of the conversion circuit 60 described previously can be alternatively provided in the side of the power factor correction converter 2. The present invention can be applied with various modifications within the spirit and scope of the invention.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

What is claimed is:
1. A switching power supply comprising:
a power factor correction converter that switches an input AC voltage and delivers a DC voltage; and
a DC-DC converter that switches the output voltage of the power factor correction converter and delivers a specified DC output voltage to a load; wherein
the DC-DC converter comprises a load condition detecting means for detecting a condition of the load, and a frequency reducing means for reducing a switching fre- quency in the DC-DC converter when a light load condition is detected by the load condition detecting means;

the power factor correction converter comprises a frequency reducing means for reducing a switching frequency in the power factor correction converter corresponding to the load condition detected by the load condition detecting means of the DC-DC converter;

the frequency reducing means of the power factor correction converter and the frequency reducing means of the DC-DC converter are each composed of a bottom skip control means that delays a turning ON timing of a respective switching element provided in the power factor correction converter and in the DC-DC converter; and the load condition detecting means comprises a load information delivering means for delivering bottom skip control information corresponding to the load condition to the power factor correction converter.

2. The switching power supply according to claim 1, wherein the DC-DC converter is a quasi-resonance converter.

3. The switching power supply according to claim 1, wherein
the load condition detecting means detects the load dividing a magnitude of the load into n steps, where n is a natural number of two or larger, determines a number of bottoms to regulate the turning ON timing of the respective switching element provided in the DC-DC converter, and delivers the determined number of bottoms as the bottom skip control information.

4. The switching power supply according to claim 1, wherein
the bottom skip control means of the power factor correction converter controls the turning ON timing of the switching element provided in the power factor correction converter with a number of bottoms different from the number of bottoms in the DC-DC converter.

* * * * *